United States Patent
Linsky et al.

(10) Patent No.: US 7,319,658 B2
(45) Date of Patent: *Jan. 15, 2008

(54) MULTIRATE, CONSTANT ENVELOPE, CONSTANT BANDWIDTH, MODULATION, CHANNELIZATION, AND DETECTION SYSTEM BASED ON ORTHOGONAL BIPOLAR SPREADING VECTORS INCLUDING BIORTHOGONAL CODING AND INCLUDING ERROR-CONTROL

(75) Inventors: Stuart T. Linsky, Rancho Palos Verdes, CA (US); David A. Wright, deceased, late of Vancouver, WA (US); by Victoria E. Simmons, legal representative, Vancouver, WA (US)

(73) Assignee: Northrop Grumman Corporation, Los Angeles, CA (US)

( * ) Notice: Subject to any disclaimer, the term of this patent is extended or adjusted under 35 U.S.C. 154(b) by 872 days.

This patent is subject to a terminal disclaimer.

(21) Appl. No.: 10/421,123

(22) Filed: Apr. 23, 2003

(65) Prior Publication Data

US 2004/0213143 A1 Oct. 28, 2004

(51) Int. Cl.
*H04J 11/00* (2006.01)
*H04K 1/10* (2006.01)
*H04L 27/00* (2006.01)
(52) U.S. Cl. .................. 370/203; 370/208; 375/260
(58) Field of Classification Search ............ 370/203, 370/208; 375/260
See application file for complete search history.

(56) References Cited

U.S. PATENT DOCUMENTS 4,613,976 A 9/1986 Sewerinson 5,619,525 A 4/1997 Wiedeman (Continued)

FOREIGN PATENT DOCUMENTS

EP 0 993 127 4/2000

OTHER PUBLICATIONS

Peterson R.L. et al., "Biorthogonal Multicode Modulation for High-Rate High-Reliability Personal Communications Requiring Controlled Peak-to-Average Transmit Power Ratio", Broadband Communications, Zurich, Switzerland, Feb. 15, 2000, pp. 263-269.

(Continued)

*Primary Examiner*—Kevin C. Harper
(74) *Attorney, Agent, or Firm*—John A. Miller; Miller IP Group, PLC

(57) ABSTRACT

A modulation channelization, demodulation and error-control system based on orthogonal bipolar spreading vectors is provided that permits a variable information rate to be transmitted without inducing envelope fluctuations and which permits multiple access without requiring the transmitter amplifier to support the combined information rate of all users. The modulation system uses the Hadamard matrix vectors to form communication channels. The information rate on any channel may be doubled by using half the vector length to transmit information. The vector that is not orthogonal-in-the-half to the rate-doubled vector is deactivated. Similarly, higher information rates may be provided through truncation of the transmission vector and the elimination of the resultant non-orthogonal vectors. The system provides biorthogonal coding in addition to multirate communication. A multi-channel receiver including a Fast Hadamard Transform structure comprised of controllable modified logic cells for performing the multi-rate communication of the present invention is illustrated.

14 Claims, 9 Drawing Sheets

U.S. PATENT DOCUMENTS

| | | | |
|---|---|---|---|
| 5,696,762 | A | 12/1997 | Natali |
| 6,445,685 | B1 * | 9/2002 | Carrozza et al. ............ 370/316 |
| 2002/0067692 | A1 * | 6/2002 | Yun et al. ................... 370/209 |
| 2004/0141525 | A1 * | 7/2004 | Bhushan et al. ............ 370/473 |
| 2006/0109936 | A1 * | 5/2006 | Ouvry et al. ............... 375/343 |

OTHER PUBLICATIONS

Harri Holma, Antti Toskala, "WCDMA for UMTS", John Wiley & Sons, West. Sussex, England, 2000, pp. 79-80.

No J-S et al., "Performance Analysis of CDMA Systems by Using Biorthogonal Codes", Asia Pacific Conference on Communications, vol. 1, 1995, pp. 326-330.

* cited by examiner

MULTIRATE, CONSTANT ENVELOPE, CONSTANT BANDWIDTH, MODULATION, CHANNELIZATION, AND DETECTION SYSTEM BASED ON ORTHOGONAL BIPOLAR SPREADING VECTORS INCLUDING BIORTHOGONAL CODING AND INCLUDING ERROR-CONTROL

BACKGROUND OF THE INVENTION

The present invention generally relates to a modulation and error-control system. More particularly, the present invention relates to a multirate modulation and eror-control system based on orthogonal bipolar spreading vectors that provides constant bandwidth and constant envelope signal.

In a digital satellite communication system, it is often desirable to support differing information transfer rates with a common modulation basis. A constant envelope (where the locus of the quadrature components in phase space of the modulation process is constrained to a circle) is often preferred to minimize spectral regrowth and other adverse effects that arise when variable envelope signals traverse a High Power Amplifier (HPA), such as a traveling wave tube.

One approach to providing differing information transfer rates is to combine individual carriers using Frequency Division Multiplexing (FDM) of several basic rate channels together with inverse multiplexing to distribute an aggregate rate stream among several lower rate transport paths. However, the fact that several carriers must be combined in FDM results, unavoidably, in amplitude fluctuations in the envelope of the combined signal which, in turn, may require additional back-off in the final microwave amplifier for the transmission to avoid intermodulation. Equivalently, a higher rated HPA may be required.

Another approach to providing differing information transfer rates is to use time multiplexing, based on Time Division Multiple Access (TDMA). In this method, all terminals are required to be able to transmit at a common burst rate and to be able to expand or contract their information transfer rate by actively transmitting during more or less of a repetitive time frame (i.e., in more or fewer time slots). This method (widely used in current satellite transmission) permits single access to the microwave amplifier so that constant envelope transmission is achieved. However, TDMA has the drawback that every terminal's HPA must be rated to support the burst rate. Since the burst rate may be much higher than the highest desired information transfer rate of a terminal, a cost penalty may be imposed on the terminal designer of lower rate terminals.

Depending on the available contrast (ratio of desired signal to undesired background) it may also be required to provide redundancy coding to achieve error control. In previous systems such error control is applied extrinsically by separate encoders and decoders.

These and other problems demonstrate that a need has long existed for a modulation and error-control system that is scalable to differing information transfer rates while providing a constant envelope and constant bandwidth. Such a system eliminates the need for the costly HPAs needed to support the burst rate in TDMA and additionally eliminates the amplitude fluctuations found in the envelope of FDM transmissions. Such a system also eliminates the need for separate error control apparatus.

SUMMARY OF THE INVENTION

One object of the present invention is provide a modulation and error-control system that is scalable to differing information transfer rates whileproviding a constant envelope and constant bandwidth signal Another objective of the present invention is to provide constant envelope operation to reduce the rating requirements of the transmitter High Power Amplifier (HPA) thereby reducing the power requirements of a satellite, for example.

Another objective of the present invention is to provide a variable information transfer rate while using the same basic modulation format.

Another objective of the present invention is to provide a system to resolve code channels using a Fast Hadamard Transform (FHT). The process to resolve code channels using the FHT may be less complex than the process to resolve the frequency channels of the Fast Fourier Transform (FFT).

Another objective of the present invention is to provide error control coding using a biorthogonal signal set. The error control decoding may be realized by an extension of the processing logic.

One or more of the foregoing objects are met in whole or in part by the multirate, constant envelope, constant bandwidth, modulation and error-control system based-on orthogonal bipolar spreading vectors of the present invention. A scalable set of bipolar spreading vectors based on a scalable Hadamard Matrix is used to form the modulation and error-control system. In one implementation, a 16-vector Hadamard Matrix with each vector comprising 16 binary elements or "chips" may be selected. The time necessary to transmit a single chip is known as the chip epoch while the time necessary to transmit all 16 chips of a vector is known as the vector epoch. Each of the 16 vectors may be transmitted and received simultaneously and thus each vector forms a communications channel providing a single bit per vector epoch per channel for a total of 16 bits per vector epoch over all channels.

By using only the first half of a given vector to transmit an information bit, a bit rate of two bits per vector epoch may be achieved using the given vector. As will be explained in more detail below, the present transmission system uses the properties of the Hadamard matrix in which each vector has only a single "partner" with which it is not "orthogonal-in-the-half." That is, when only the first eight chips of each vector in the Hadamard matrix are considered, only two vectors in the matrix are not orthogonal. The properties of the Hadamard matrix are expandable to support information rates that are powers of two bits per vector epoch over a single channel.

Additionally, the modulation method used in the transmission system may be adapted to provide, for example, biorthogonal coding. Biorthogonal coding may result in improved coding gain and error correction.

The modulation and error-control system of the present invention eliminates the need for the costly HPAs needed to support the burst rate in TDMA systems and may additionally eliminate the amplitude fluctuations found in the envelope of FDM transmissions. Additionally, the modulation and error-control system of the present invention provides scalable information transfer rates while maintaining efficient power and bandwidth usage.

These and other features of the present invention are discussed or apparent in the following detailed description of the preferred embodiments of the invention.

BRIEF DESCRIPTION OF THE DRAWINGS

FIG. 1 shows an exemplary 16×16 Hadamard matrix.

DETAILED DESCRIPTION OF THE PREFERRED EMBODIMENTS

Figure 2:
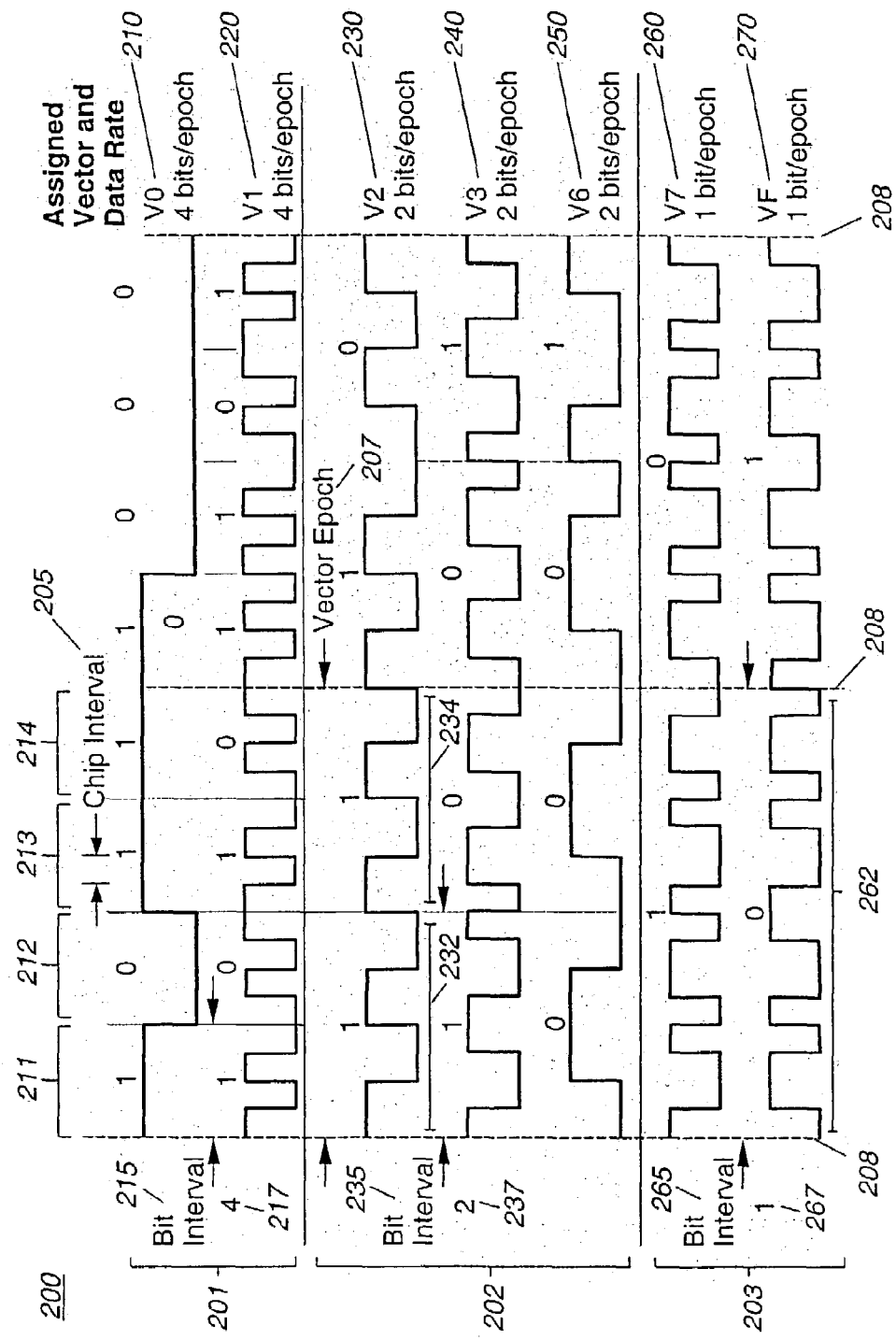
FIG. 2 illustrates a waveform timing diagram for a preferred embodiment of the modulation and error control system.

In the present invention, a set of modulating waveforms based on orthogonal spreading vectors (as described below) are shared among a set of active users. Each active terminal transmits at the same rate called the chip rate, but unlike conventional Code Division Multiple Access (CDMA), different users may have different information rates. The present invention allows information rates to vary as powers of two times the base information rate.

In the present invention, transmitters use a modulation based on a signal comprised of $2^v$ (where v is any positive integer) "chips," or symbols that are aggregated together into an epoch. Preferably, the modulation is based on a signal comprised of 256 chips (v=8), which may be implemented as an extension to the specific example presented below with v=4.

For specificity, the case where v=4 is used in the following example and throughout. Consequently, the epoch size is $2^4$=16 chips. The concept is readily generalized to other values of v (e.g., 32, 64 or 128 chips) and the present invention is not limited to any specific value of v.

FIG. 1 illustrates an exemplary 16×16 Hadamard matrix 100 (also known as a Hadamard set). Each of the sixteen rows comprises a vector of sixteen elements. Each of the sixteen vectors is labeled V0 through VF in FIG. 1. Each vector includes sixteen elements numbered as shown. Each of the elements is bipolar; i.e., the element is in one of two states such as the binary 1 and 0 or the "+" and "−" as shown in FIG. 1. Each of the sixteen vectors is orthogonal to all of the other vectors in the Hadamard matrix.

Since each vector is orthogonal to all others in the set (when the vectors are time-aligned at both the chip and the epoch level), concurrent communications in a common frequency interval can exist without interference among a set of up to sixteen users (one user for each vector). For example, each of the sixteen users may be assigned one vector which may be used to convey one information bit per 16-chip epoch. However, because the single information bit is spread over sixteen chips, the frequency bandwidth for each user is approximately sixteen times that which would be required for a single user. Collectively, the information transfer rate is sixteen bits per 16-chip epoch, with one bit per 16-chip epoch being contributed from each of the sixteen users. When used to binary phase modulate a carrier (i.e., as in Binary Phase Shift Keying (BPSK)), the sixteen vectors each produce a constant envelope signal.

In operation, for one-bit-per-epoch signaling, each basic vector is either used unchanged or appears inverted in all sixteen positions, depending on the information bit. For example, transmitting a binary 0 as an information bit using the vector V4 results in the chip sequence (++++−−−−++++−−−−), while a binary 1 may be indicated by inverting all sixteen positions of V4 to form the sequence (−−−−++++−−−−++++). Thus, the vectors are used in a bipolar manner to achieve binary transmission.

Turning to the Hadamard vectors, each 16-component vector may be segmented into two 8-component parts by separating the vector in half, with the first part comprising the first eight components and the second part comprising the last eight components. The two parts are either identical or antipodal to each other.

For example, the vector V4 is the sequence (++++−−−−++++−−−−), which may be segmented into a first part made up of the sequence (++++−−−−) and a second part made up of the sequence (++++−−−−). Thus, the first and second parts of the vector V4 are identical to each other. In comparison, the vector VC above is the sequence (++++−−−−−−−−++++), which may be segmented into a first part made up of the sequence (++++−−−−) and a second part made up of the sequence (−−−−++++). Thus, the first and second parts of the vector VC are antipodal to each other.

Any one of the vectors V0-VF may be used to transmit two information bits per 16-chip epoch by restricting the use of the positive or negative form to one of the halves of the vector. In other words, by truncating the vector sequence from a bipolar 16-chip sequence to a bipolar 8-chip sequence, two information bits may be transmitted per 16-chip epoch.

For example, vector V4 above is the sequence (++++−−−−++++−−−−). Normally, for the user assigned vector V4, (++++−−−−++++−−−−) may indicate a binary 0 and (−−−−++++−−−−++++) may indicate a binary 1, for example. If instead the user is assigned the 8-chip sequence of the first half of the vector V4 (++++−−−−) to convey information bits, the sequence (++++−−−−) may indicate a binary 0 and the sequence (−−−−++++) may indicate a binary 1, for example. The 16-chip sequence (++++−−−−++++−−−−) may indicate a binary 0 if the complete vector V4 is used, while the same 16-chip sequence may represent two concatenated 8-chip sequences indicating the two bit sequence 00 if only the first half of the vector V4 is used. Thus, by using half of the vector, the information bit rate for a given user may be increased from one bit per 16-chip epoch to two bits per 16-chip epoch.

In such a signaling scheme, the occupied spectrum would remain unchanged (assuming the same chip rate) and the constant envelope property is preserved. As a result of the truncation, however, not all of the sixteen vectors remain orthogonal. For example, using the 8-chip sequence derived from the first half of the vector V4 (++++−−−−) to transmit a certain bit sequence may result in a generated sequence identical to vector VC (++++−−−−−−−−++++) or its antipode. Thus, the concatenated 8-chip sequence representing vector V4 is no longer orthogonal to vector VC at all times.

The 8-chip sequence representing vector V4 is identical to the first half of the vector VC and antipodal to the second half of the vector VC.

Referring again to the matrix 100 above, the 8-chip sequence representing vector V4 continues to remain orthogonal to all of the first and second halves of the vectors V0-VF except for VC. Although usage of the 8-chip sequence for vector V4 may interfere with communication over vector VC because of the lack of orthogonality, communication over all of the other vectors is unaffected.

By excluding VC (i.e., not allowing VC to be used for communications traffic), the 8-chip sequence of V4 may be used to transmit two information bits per 16-chip epoch while the remaining fourteen vectors may be used to transmit one information bit per 16-chip epoch. The total information rate remains at sixteen bits per 16-chip epoch, but not all users are constrained to the same information rate (i.e., the user using V4 has an information rate twice that of the other users.) Note that with the elimination of the vector VC, the system may service fifteen rather than sixteen users simultaneously, although one user has a doubled data rate.

The vectors V0-VF may be segmented into two groups: a first group comprising vectors V0-V7 and a second group comprising V8-VF. The first halves of the vectors in first group (V0-V7) are identical in sequence to the first halves of the vectors in the second group (V8-VF). That is, the first half of vector V0 is identical to the first half of V8; the first half of V1 is identical to the first half of V9; the first halves of V2 and VA are identical; and so on in sequence.

Among the vectors in the first group (V0-V7), the second half of each vector is the first half of the vector repeated. That is, the first half is identical to the second half. For example, the first half of vector V4 (++++----) is identical to the second half of vector V4 (++++----). Among the vectors in the second group (V8-VF), the second half of each vector is the antipode of the first half of the vector. That is, the first half is the exact opposite of the second half. For example, the first half of vector VC (++++----) is the antipode of the second half of the vector VC (----++++).

Each vector V0-VF has one and only one "partner" vector with which it is not "orthogonal-in-the-half." That is, for each half of each vector, only one other vector contains that half or its antipode. For example, vector V4 is not orthogonal-in-the-half with vector VC. The 8-chip sequence of any vector half may be used to convey information at a rate of two information bits per 16-chip epoch as long as the partner vector is not used.

Communications may also be supported having, for example, a mix of two users at two information bits per 16-chip epoch plus twelve users at one information bit per 16-chip epoch. However, the partner vectors for both of the users operating at two information bits per 16-chip epoch are deactivated. As another example, communications can be supported for eight users at two information bits per 16-chip epoch.

Because the data transfer rate remains constant, the present invention yields constant envelope and constant occupied bandwidth without interference. This minimizes adverse transmission effects such as spectral regrowth.

The present invention may be extended to greater information rates per 16-chip epoch for a single user. For example, each vector may be divided into quarters of four elements. For example, vector V4 (++++----++++----) may be divided sequentially into a first quarter (++++), a second quarter (----), a third quarter (++++), and a fourth quarter (----). It may be seen from FIG. 1 that each vector is then not "orthogonal-in-the-quarter" with three other vectors. For example, vector V4 (++++----++++----) is not orthogonal in the quarter with vectors V0 (++++++++++++++++) V8 (++++++++--------), and VC (++++--------++++).

Similar to the above description of using the 8-chip sequence representing one half of V4 for transmitting two information bits per 16-chip epoch, the 4-chip sequence representing one quarter of V4 may be used for transmitting four information bits per 16-chip epoch. As described above, using the 8-chip sequence of V4 for transmitting two information bits per 16-chip epoch necessitates the deactivation of vector VC, which is not orthogonal-in-the-half with V4, to prevent interference. Similarly, using the 4-chip sequence of V4 for transmitting four information bits per 16-chip epoch necessitates the deactivation of any vector not orthogonal-in-the-quarter with V4, namely vectors V0, V8, and VC.

Alternatively, for example, the 4-chip sequence of one quarter of V0 may be used for transmitting four information bits per 16-chip epoch if V4, V8, and VC are deactivated, or V8 may be used if V0, V4, and VC are deactivated, and so on. The remaining twelve vectors are not affected by using the 4-chip sequence even though a single user has a data rate of four information bits per 16-chip epoch and a total of 13 users are being served. Although a single user is communicating at a higher data rate, the overall data transfer rate remains constant, yielding a constant envelope and constant occupied bandwidth while minimizing adverse transmission effects such as spectral regrowth.

The present invention may be further extended in that the 2-chip sequence representing one eighth of a vector may be used to establish an information rate of eight information bits per 16-chip epoch. The use of the 2-chip sequence necessitates the deactivation of any vector not orthogonal-in-the-eighth with the chosen 2-chip sequence. For example, for V4 (++++----++++----) use of the 2-chip sequence representing one eighth of V4 (++) necessitates the deactivation of the seven non-orthogonal vectors V0 (++++++++++++++++), V2 (++--++--++--++--), V6 (++----++++----++), V8 (++++++++--------), VA (++--++----++--++), VC (++++--------++++), and VE (++----++--++++--). As in the 8-chip sequence and 4-chip sequence examples above, with the use of the 2-chip sequence the remaining eight vectors are not affected even though a single user has a data rate of eight information bits per 16-chip epoch and a total of 9 users are being served. Also, as above, although a single user is communicating at a higher data rate, the overall data transfer rate remains constant, yielding a constant envelope and constant occupied bandwidth while minimizing adverse transmission effects such as spectral regrowth.

Any combination of 2-chip sequences, 4-chip sequences, 8-chip sequences, and 16-chip sequences may be accommodated as long as proper orthogonality is maintained. For example, the 2-chip sequence of one eighth of V0 (++) may be used to give a single user an information rate of eight information bits per 16-chip epoch (V2, V4, V6, V8, VA, VC, VE deactivated). Simultaneously, the 4-chip sequence of one fourth of V1 (+-+-) may be used to give a single user an information rate of four information bits per 16-chip epoch (V5, V9, VD deactivated). At the same time, the 8-chip sequence of one half of V3 (+--++--+) may be used to give a single user an information rate of two information bits per 16-chip epoch (VB deactivated). Concurrently, V7 and VF may each service users at a rate of one information bit per 16-chip epoch. Thus, five users may be serviced at rates of 8 (V0), 4 (V1), 2 (V3), 1 (V7), and 1 (VF)

information bits per 16-chip epoch. The total information rate remains constant at 8+4+2+1+1=16 information bits per 16-chip epoch.

Generalizing this approach, the system described above yields five possible data rates for a single user, with each data rate corresponding to a sequence of a different length. That is, a single user may have a data rate of one information bit, two information bits, four information bits, eight information bits, or sixteen information bits per 16-chip epoch. Each of the data rates can be expressed as the number two raised to a power from 0 to 4; i.e., $1=2^0$, $2=2^1$, $4=2^2$, $8=2^3$, $16=2^4$.

An expression for the total number of users that may be simultaneously serviced at each of the five data rates may be written as:

$$N_0*2^0+N_1*2^1+N_2*2^2+N_3*2^3+N_4*2^4 \leq 16 \quad \text{Eqn. 1}$$

where $N_0$ represents the number of users operating at an information rate of one ($2^0=1$) bit per 16-chip epoch, $N_1$ represents the number of users operating at an information rate of two ($2^1=2$) bits per 16-chip epoch, $N_2$ represents the number of users operating at an information rate of four ($2^2=4$) bits per 16-chip epoch, $N_3$ represents the number of users operating at an information rate of eight ($2^3=8$) bits per 16-chip epoch, and $N_4$ represents the number of users operating at an information rate of sixteen ($2^4=16$) bits per 16-chip epoch.

For example, the case $N_0=2$, $N_1=3$, $N_2=2$ may be implemented by using vectors V0 and V1 ($N_2=2$) at a data rate of four ($2^2=4$) information bits per 16-chip epoch, V2, V3, and V6 ($N_1=3$) at a data rate of two ($2^1=2$) information bits per 16-chip epoch, and V7 and VF ($N_0=2$) at a data rate of one ($2^0=1$) information bit per 16-chip epoch. For this example, Eqn. 1 becomes:

$$2*2^0+3*2^1+2*2^2+0*2^3+0*2^4 \leq 16$$

$$2+6+8 \leq 16$$

In this example, seven distinct user signals access the same bandwidth, each composed of a stream of bipolar chips at the same chip rate, although the corresponding data rates per 16-chip epoch varies between users. Because the chip rate remains constant for all users, the system is amenable to constant envelope modulation, as mentioned above, and adverse transmission effects are minimized. The seven user signals also have the same spectral occupancy, and all seven signals are mutually orthogonal for all data content so long as chip-level synchronization is maintained.

Each vector of the Hadamard matrix is composed of $2^v$ chips, where v is any positive integer, depending upon the size of the matrix. The information transfer rate of any vector can be expressed as a power of two times the base rate of one information bit per $2^v$-chip epoch, or $2^n$ times the base information rate. Providing information rates greater than the base rate necessitates the exclusion of nonorthogonal vectors. For a vector operating at $2^n$ times the base information rate, ($2^n-1$) vectors in the matrix an not orthogonal and must be excluded. The chip length of the vector operating at $2^n$ times the base information rate may be expressed as $2^{(v-n)}$.

FIG. 2 illustrates a waveform timing diagram 200 for the preferred embodiment of the communications system described above. The waveform timing diagram 200 is divided into three regions, a first region 201, a second region 202, and a third region 203. Each region has a corresponding bit interval 215, 235, 265 and each region has a corresponding data rate 217, 237, 267 expressed in information bits per 16-chip epoch. The length of time for each chip is indicated as the chip interval 205. The length of time for each 16-chip vector epoch is indicated as the vector epoch 207. The dotted lines 208 represent the edges of successive vector epochs. The chip interval 205 and vector epoch 207 are constant for all vectors 210-270.

The first region 201 includes the waveforms for vector V0 210 and vector V1 220, each of which has a data rate 217 of four information bits per 16-chip vector epoch 207. The bit interval 215 for each information bit is shown. That is, in the first region 201, each vector epoch 207 contains four bit intervals 211, 212, 213, 214 and each bit interval corresponds to an information bit. The actual information bit conveyed by each of the vectors V0 210 and V1 220 during each bit interval 211, 212, 213, 214 is displayed above the corresponding waveform for that bit interval. Each bit interval 211, 212, 213, 214 is four chip intervals 205 in length.

For example, for the vector V0 210, having a data rate of four information bits per epoch, the data string "1011" is sent over the first 16-chip vector epoch 207. A logical 1 is sent during the first 4-chip bit interval 211, a logical 0 is sent during the second 4-chip bit interval 212, a logical 1 is sent during the third 4-chip bit interval 213, and a logical 1 is sent during the fourth 4-chip bit interval 214.

The second region 202 includes the waveforms for vector V2 230, vector V3 240, and vector V6 250, each of which has a data rate 237 of two information bits per 16-chip vector epoch 207. The bit interval 235 for each information bit is shown. That is, in the second region 202, each vector epoch 207 contains two bit intervals 232 and 234 and each bit interval corresponds to an information bit. The actual information bit conveyed by each of the vectors V2 230, V3 240, and V6 250 during each bit interval 232, 234 is displayed above the corresponding waveform for that bit interval. Each bit interval 232, 234 is eight chip intervals 205 in length.

For example, for the vector V2 230, having a data rate of two information bits per epoch, the data string "11" is sent over the first 16-chip vector epoch 207. A logical 1 is sent during the first 8-chip bit interval 232 and a logical 1 is also sent during the second 8-chip bit interval 234.

The third region 203 includes the waveforms for vector V7 260 and vector VF 270, each of which has a data rate 267 of one information bit per 16-chip vector epoch 207. The bit interval 265 for each information bit is shown. That is, in the third region 203, each vector epoch 207 contains a single bit interval 262 and each bit interval corresponds to an information bit. The actual information bit conveyed by each of the vectors V7 260 and VF 270 during the bit interval 262 is displayed above the corresponding waveform for the bit interval 262. The bit interval 262 is sixteen chip intervals 205 in length.

For example, for the vector V7 260, having a data rate of one information bit per vector epoch 207, the data bit "1" is sent over the first 16-chip vector epoch 207. The logical 1 is sent during the 16-chip bit interval 262.

In FIG. 2, the waveforms for each vector V0-VF 210-270 are shown with the same amplitude. In operation however, to provide constant energy per bit, the higher information rate signals must have a greater amplitude than the lower rate signals. For example, waveforms in the first region 201 (vectors V0 210 and V1 220), each having a data rate of four information bits per 16-chip epoch, must have an amplitude twice that of the waveforms in the third region 203 (vectors V7 260 and VF 270), each having a data rate of one information bit per 16-chip epoch, in order to maintain a power ratio of four-to-one needed to maintain a constant energy level per information bit. Similarly, the waveforms in the second region 202 (vectors V2 230, V3 240, and V6 250), each having a data rate of two information bits per 16-chip epoch, must have an amplitude of approximately 1.414 times that of the waveforms in the third region 203.

As mentioned above, in order to maintain orthogonality, all signals arriving at the receiver must be synchronized not only at the vector epoch level but also at the chip interval level. Since the chip interval timing is much shorter than the vector epoch, the chip timing is the more performance-limiting factor, and the precision of time-of-arrival must preferably be maintained to the order of a few percent of a chip interval time. For a typical case, the chip interval time may be roughly 500 nanoseconds, and in order to maintain synchronization, chip alignment must be maintained to within a standard deviation of 5.0%. This implies that an accuracy of 25 nanoseconds in chip timing synchronization is required for the typical case cited above. The 25 nanosecond chip timing synchronization is consistent with the accuracy achievable with advanced processing payloads and their associated community of user earth terminals.

Processing components for the present modulation system include a modulator at the transmitting end and a demodulator at the receiving end. The following description assumes that conventional (rectangular) Binary Phase Shift Keying (BPSK) is used, but the present system is readily adaptable to other variants including Quatenary Phase Shift Keying (QPSK) and symbol shaping. The implemented modulator may be conventional except that a spreading function is used to bridge between the information source and the point at which channel symbols are created.

For example, consider a system operating at a chip rate of 320,000 chips per second and a user terminal sending two information bits per 16-bit epoch using a vector from the 16-vector set in the discussion above. Assigning one of the vectors to convey data at a rate of two information bits per 16-chip epoch necessitates the exclusion of one of the other vectors. As an example, if vector V3 (+--++--++--++--+) is used as the communication vector, the partner vector which is not orthogonal-in-the-half to V3, namely vector VB, may not be used.

In operation, the spreading function used is the first half of V3 (+--++--+). In this case, the information transfer rate is one-eighth the chip rate, or 320,000/8=40,000 information bits per second. The data transfer rate of 40,000 information bits per second corresponds to receiving an information bit every 25 microseconds.

Thus, for this example, every 25 microseconds the sending modulator receives an information bit from the information source and maps the information bit into 8 symbols (or chips) each having a chip interval of 3.125 microseconds. These chips are formed into the eight-chip, bipolar, modulating pattern based on the first half of vector V3. That is, the modulating pattern is either (+--++--+) or (-++--++-), depending on whether the information bit is a logical 0 or 1. These chip patterns are used to produce the transmitted 320 kilosymbol-per-second waveform consisting, in this example, of rectangular BPSK symbol chips.

The preferred receiver structure for signals of the above matrix may require that each of the orthogonal vectors be isolated from the others so that a decision may be made on whether the composite vector signal bears a logical 0 or a logical 1 (i.e., on whether the signal was sent in the positive sense or the negative sense).

Figure 3:
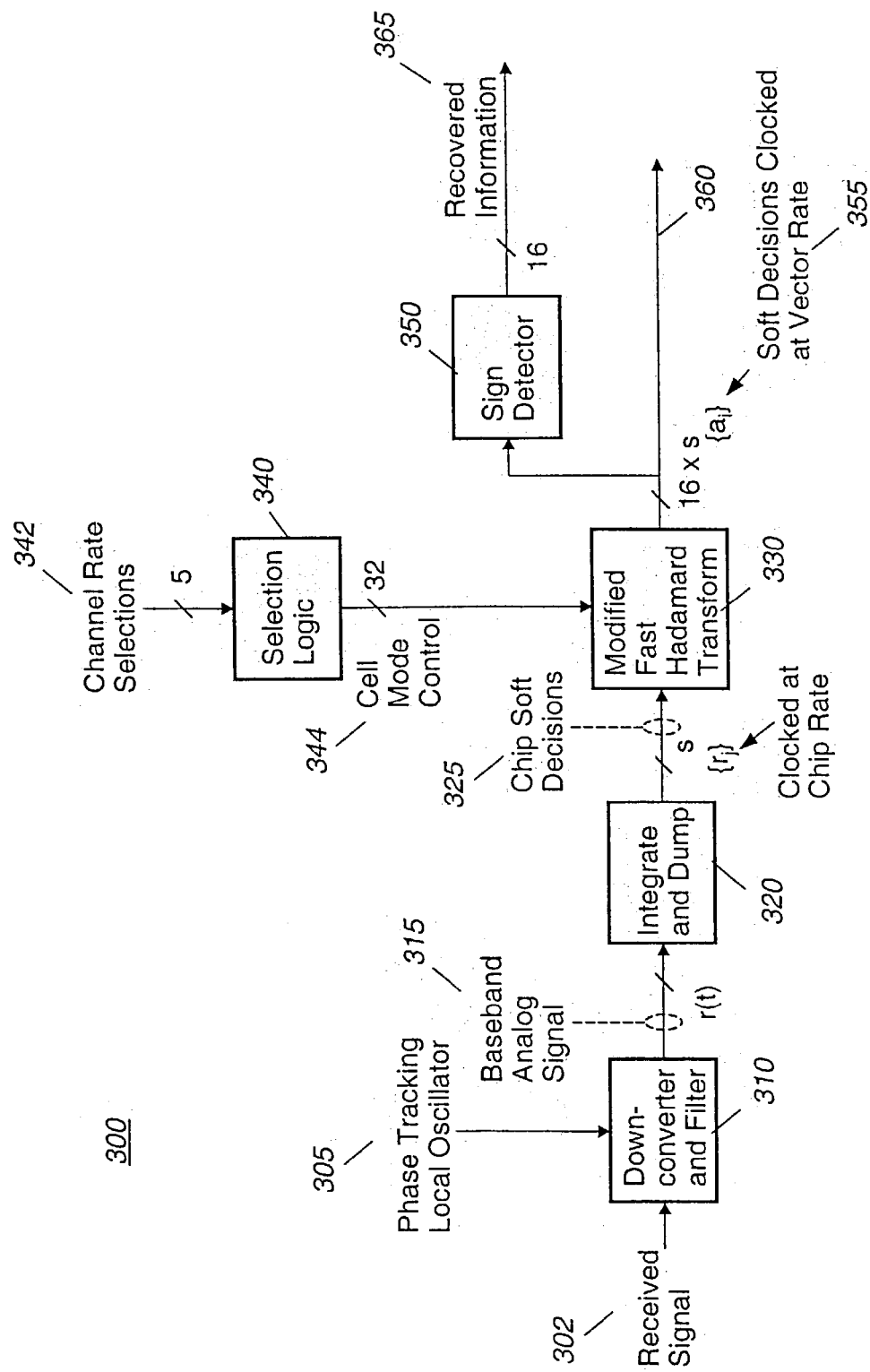
FIG. 3 illustrates a preferred embodiment of the structure of a multi-channel receiver (excluding the error control functions) according to a preferred embodiment of the present invention.

FIG. 3 shows a preferred embodiment of the structure of a multi-channel receiver 300 incorporating the present invention. The multi-channel receiver 300 includes a downconverter and filters block 310, an integrate and dump block 320, a modified Fast Hadamard Transform (FHT) block 330, a selection logic block 340 and a sign detector block 350.

In operation, a received signal 302 is supplied to the downconverter and filters block 310. Timing signals are also supplied to the downconverter and filters block 310 from a phase-tracking local oscillator (LO) 305. The downconverter and filters block 310 converts the received signal 302 from the carrier frequency (preferably at a frequency of a few GHz) to a baseband analog signal r(t) 315.

The baseband analog signal r(t) 315 is supplied to the integrate and dump block 320 where the baseband analog signal r(t) 315 is correlated against the predetermined source waveforms used by the sender and shown in the matrix 100 above. Each such received waveform is formed as the concatenation of 16 (in this example) rectangular pulses. The integrate and dump block 320 first demodulates these pulses individually to obtain chip-level soft-decision observables $\{r_j\}$ 325 (for j=0 to 15 in the present example) In the preferred case, with rectangular BPSK, the formation of $\{r_j\}$ 325 involves passing the baseband received signal r(t) 315 through the integrate and dump circuit block 320. The integrate and dump block 320 may be implemented as a matched filter for each signal.

The chip level soft decision observables $\{r_j\}$ 325 may be expressed as:

$$r_j = \int_{j*T_c}^{(j+1)*T_c} r(t)\,dt \qquad \text{Eqn. 2}$$

where $T_c$ is the duration of a chip interval 205 (which may also be called the duration of a modulation symbol or a symbol interval).

After forming the soft decision observables $\{r_j\}$ 325 for j=0 to $2^v-1$ the receiver 300 completes the correlation process by transmitting $\{r_j\}$ 325 to the modified Fast Hadamard Transform (FHT) block 330, which performs the full correlation. The full correlation for the ith channel (where i runs from 0 to $2^v-1$) may be expressed as $a_i$ where:

$$a_i = \sum_{j=0}^{2^v-1} v_{ij} * r_j \qquad \text{Eqn. 3}$$

and $v_{ij}$ is the jth component of the vector $V_i$.

The output of the Modified FHT block 330 is sent to the sign detector block 350, which then selects the sent bit for the ith channel based on whether the correlation is positive or negative. The correlation may be passed downstream 360 for further processing such as, for example, error control decoding, phase tracking, or symbol time tracking.

The receiver structure 300 including: the detailed structure 400 of the FHT; the basic processing elements 500 of the FHT; and the control structure 600 may be utilized on a stand alone basis as described in U.S. patent application Ser. No. 10/421,081, entitled "Multirate, Constant Envelope, Constant Bandwidth, Modulation, Channelization and Detection System Based on Orthogonal Bipolar Spreading Vectors", in the names of Stuart Linsky and David Wright and filed concurrently. The present invention includes intrinsic error control based on the correlations produced by the Modified FHT block 330, which under the conditions of usage described later in this description correspond to those produced in a maximum likelihood decoder for a biorthogonal code, so that with minimal additional processing, the receiver structure 300 may be adapted to perform error control decoding.

The process described mathematically above for determining $a_i$ is generally identical to the process of taking the Hadamard transform of $\{r_j\}$ to $\{a_i\}$. This process is analogous to a "fast" algorithm in the same way that the well-known Fast Fourier Transform (FFT) carries out the Discrete Fourier Transform (DFT). In an FFT operating on a sample set of size $2^v$, the operations may be viewed as being performed in "v" major steps on a vector of $2^v$ components as the input and output of each step. The processing between the vectors may be resolved into $2^v$-1 basic substeps, where each such substep has two complex inputs from the input vector and provides two to the output vector. This two-in-two-out substep is usually referred to as a "butterfly" in the context of an FFT. Note that an FFT butterfly actually has four scalar inputs and outputs since each complex variable is composed of distinct real and imaginary parts.

Figure 4:
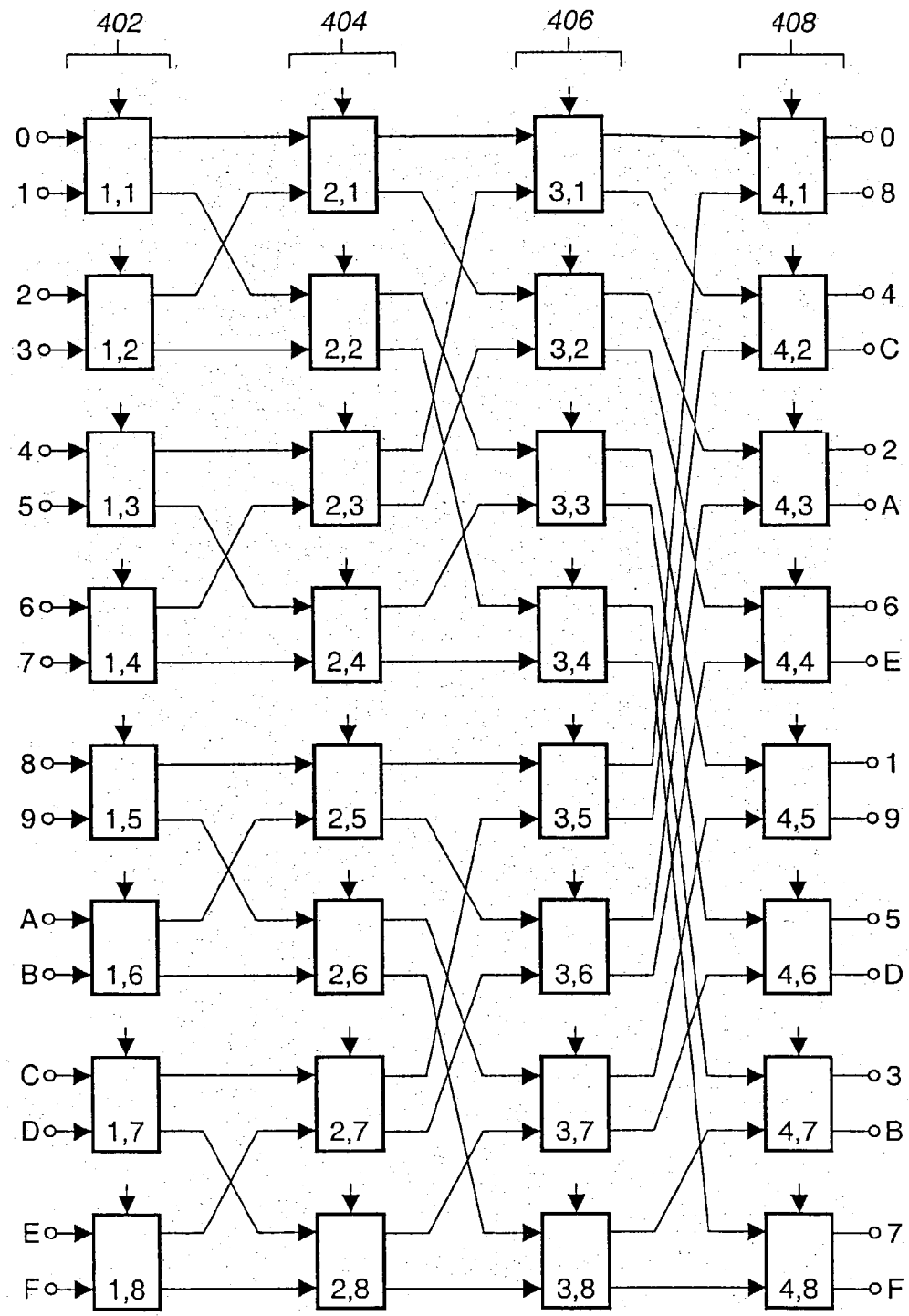
FIG. 4 shows a Fast Hadamard Transform (FHT) structure of a preferred embodiment of the present invention.

A Fast Hadamard Transform (FHT) structure 400 of the present invention is shown at FIG. 4 for the example case of v=4, to continue the present example. The FHT structure 400 includes 32 logic cells from (1,1) to (4,8) numbered as an array in the format (column, row). The 32 logic cells (1,1)-(4,8) are arranged into four columns: column 1 402, column 2 404, column 3 406 and column 4 408. Each column 402-408 includes eight logic cells. Column 1 includes sequentially logic cells (1,1) to (1,8); column 2 includes sequentially logic cells (2,1) to (2,8); column 3 includes sequentially logic cells (3,1) to (3,8); and column 4 includes sequentially logic cells (4,1) to (4,8).

Each logic cell has two inputs and two outputs. Thus, each column has sixteen inputs (0-F) that are processed in eight sets of two to yield an equal number of outputs. That is, two of the sixteen inputs for each column are supplied to each of the eight logic cells of the column for processing. After processing, each logic cell also generates two separate outputs for further processing. Each processing step in the FHT structure 400 is performed by similar logic cells (shown as small rectangles in FIG. 4). Overall, the processing of the FHT structure 400 is generally similar to the butterfly of the FFT, but is simpler and more efficient.

Each of the logic cells have an upper input $i_u$, a lower input $i_l$, an upper output $o_u$, and a lower output $o_l$. The outputs of each cell may be mathematically described as:

$$o_u=(i_u+i_l)/2$$

$$o_l=(i_u-i_l)/2$$

That is, the upper output is the sum of the inputs and the lower output is the difference of the inputs. In each case, the results are scaled by a factor of two, by dropping the low-order bit thus keeping the number of bits presented to each cell identical (although such scaling is not fundamental to the present invention.)

Referring again to FIG. 4, the basic cells are arranged in columns and rows, with each column corresponding to one of the v steps in the transformation. Defining a generic column number as "c", the connections among the cells in column c to column c+1 (successive columns) are determined as follows (note that c runs from 1 to 4 in FIGS. 4 or 1 to v in the general case):

First, the cells are divided into $2^{v-c}$ sets of $2^c$ cells each. For instance, in the present example where v=4 and c runs from 1 to 4, the cells are divided into $2^{v-c}=2^{4-1}=8$ sets of $2^c=2^1=2$ cells each, $2^{v-c}=2^{4-2}=4$ sets of $2^c=2^2=4$ cells each, $2^{v-c}=2^{4-3}=2$ sets of $2^c=2^3=8$ cells each, and $2^{v-c}=2^{4-4}=1$ sets of $2^c=2^4=16$ cells each.

Second, starting from the top of each set and progressing downward in sequential order, the outputs from column c are connected to the next upper input of the same set in column c+1.

Third, starting from the bottom of each set and progressing upward in sequential order, the outputs from column c are connected to the next lower input of the same set in column c+1.

Finally, the above steps two and three are continued until all of the v columns are interconnected.

The resultant structure shown in FIG. 4 is generally similar to the structure of the FFT. Also, similar to the FFT, the FHT structure's jth output represents the correlation with Vj' where j' equals j when bit-reversed.

During operation of the FHT structure 400, a single bit representing a chip soft decision $\{r_j\}$ 325 is sequentially supplied to each of the 16 inputs 0-F of the first column 402. Each logic cell (1,1)-(1,8) in the first column 402 then adds the upper input $i_u$ and the lower input $i_l$ supplied to it, removes the least significant bit of the addition (divides by two), and supplies the sum to the upper output $o_u$ of the cell. At the same time, each logic cell (1,1)-(1,8) in the first column 402 subtracts the lower input $i_l$ and the upper input $i_u$ supplied to it, removes the least significant bit of the addition (divides by two), and supplies the result to the lower output $o_l$.

The upper and lower outputs of each of the logic cells in the first column 402 are supplied as inputs to the logic cells of the second column 404. Each logic cell (2,1)-(2,8) in the second column 404 adds its upper and lower inputs $i_u$, $i_l$ and divides by two to form the upper output $o_u$ of the cell. Simultaneously, each logic cell (2,1)-(2,8) in the second column 404 subtracts its lower and upper inputs $i_l$, $i_u$ and divides by two to form its lower output $o_l$.

The upper and lower outputs of each of the logic cells in the second column 404 are supplied as inputs to the logic cells of the third column (3,1)-(3,8) 406. The logic cells of the third column 306 perform the addition and subtraction operations described above to form their respective upper and lower outputs.

The outputs of the logic cells of the third column 406 are supplied to the fourth column (4,1)-(4,8) 408. The logic cells of the fourth column 408 perform the addition and subtraction operations described above to form their upper and lower outputs. The outputs of the logic cells of the fourth column form the full correlation $a_j$, which is then passed from the Modified FHT block 330 to the sign detector block 350 and may additionally be passed downstream 360 for further processing.

Note that, due to the processing of the FHT, the sequence of the outputs of the fourth column 408 is not in numerical order. Instead, the output of each of the logic cells in the fourth column 408 are the two non-orthogonal-in-the-half partner vectors. For example, the output of the logic cell (4,1) is the vector V0 and the vector V8. Recall that vector V8 was identified above as the only non-orthogonal-in-the-half vector to vector V0.

Also notice that the eight logic cells of the fourth column 408 may be divided sequentially into four groups of two logic cells each, namely a first group including cells (4,1) and (4,2); a second group including cells (4,3) and (4,4); a third group including cells (4,5) and (4,6); and a fourth group including cells (4,7) and (4,8). For each group of cells, the four outputs of the cells in the group correspond to a set of vectors that are non-orthogonal-in-the-quarter. For example, the outputs of the cells in the first group correspond to vectors V0, V8, V4, and VC. Recall that vectors V0, V8, and VC were identified above as the non-orthogonal-in-the-quarter vectors to vector V4.

To this point, the receiver structure has been described in terms of one-bit-per-vector usage. However, one of the key features of the present invention is the ability to provide multiple bits per vector epoch of information transfer using the same basic set of code vectors.

The basic FHT structure of FIG. 4 may be modified to allow data rates of multiple bits per vector epoch as described below. First, note that each of the cells in the fourth column 408 of the FHT structure of FIG. 4 has, as its input pair, partial vector correlations based on the first half of a code vector from $\{V_j\}$ where the upper inputs are based on the first half of the observables and the lower inputs are based on the second half of the observables. By the operation of the cell, the outputs agree in the first half of their pattern and are antipodal in the second half.

Thus, two vectors that are not mutually orthogonal-in-the-half are paired at the same output cell. When two information bits per epoch are sent, the two identical halves of one of the code vectors are used to carry each bit. For a user with a data rate of two bits per epoch, the correlations for the two separate information bits are separately presented at the inputs to a rightmost logic cell.

To support a data transfer rate of two information bits per epoch, the FHT structure may be modified to move these variables to the output without further processing. In other words, the basic FHT structure may be adapted to allow a data transfer rate of two information bits per epoch by modifying the basic logic cell function to include a pass-through or "pass" mode as well as the previous combine (or "comb") mode.

The functionality of each logic cell then becomes:

| Mode | $o_u$ | $o_l$ |
|---|---|---|
| Comb | $(i_u + i_l)/2$ | $(i_u - i_l)/2$ |
| Pass | $i_u$ | $i_l$ |

That is, the modified cell logic performs the standard FHT functions, but may be alternatively configured to pass through the upper input to the upper output and pass through the lower input to the lower output unchanged.

Figure 5:
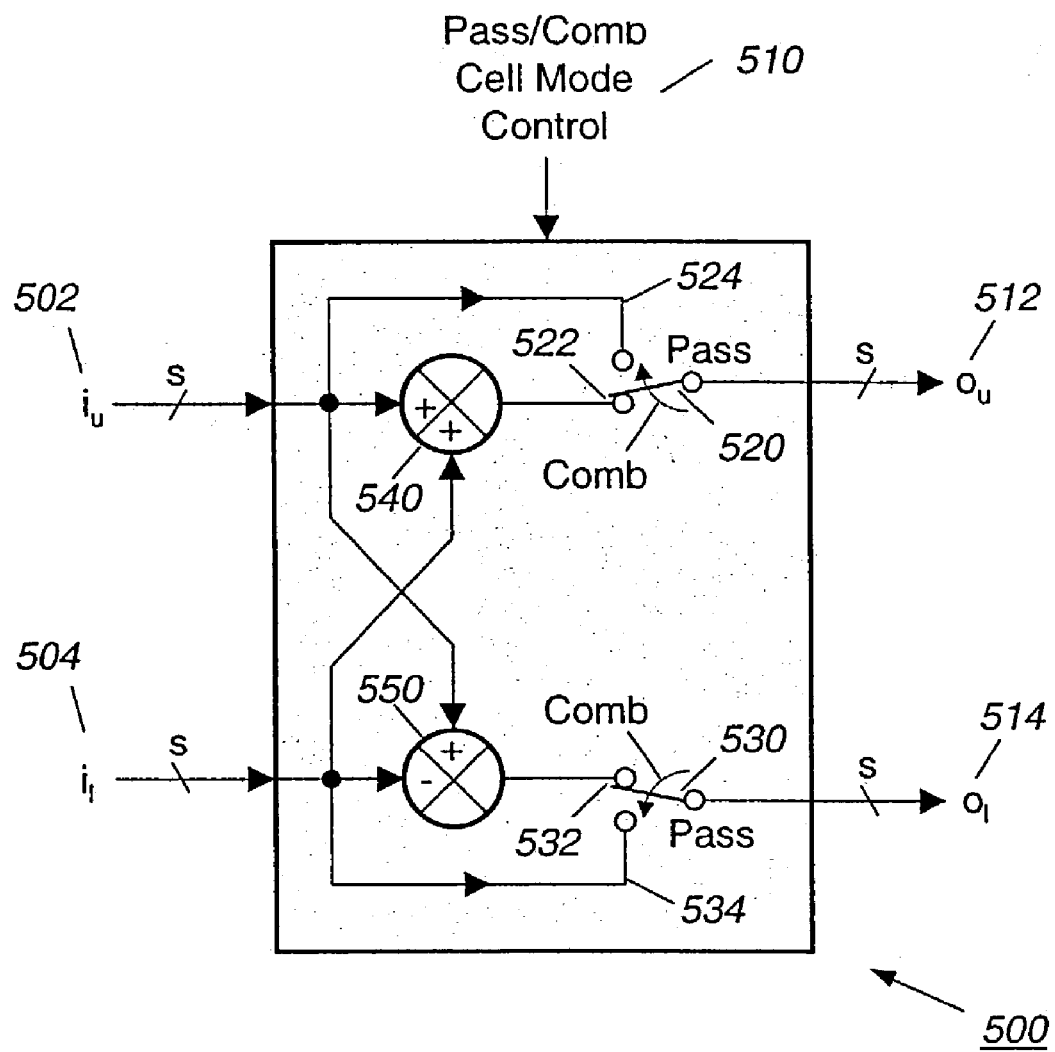
FIG. 5 illustrates a preferred embodiment of a modified logic cell of the modified FHT according to the present invention.

The structure of a modified logic cell 500 for the modified FHT is shown in FIG. 5. The modified logic cell 500 includes an upper input $i_u$ 502, a lower input $i_l$ 504, an upper output $o_u$ 512, a lower output $o_l$ 514, a mode control 510, an upper switch 520, a lower switch 530, an upper adder 540, and a lower subtractor 550.

The mode control 510 is a control signal generated by the selection logic 340 in FIG. 3. The mode control 510 selects either standard FHT mode or pass-through mode for the modified logic cell 500. If the standard FHT "comb" mode is selected, the upper switch 520 makes an electrical connection with an upper combination lead 522 and the lower switch 530 make an electrical connection with a lower combination lead 532 to allow the modified logic cell 500 to perform the standard FHT.

The modified logic cell 500 then performs the standard FHT as follows: The upper input $i_u$ 502 enters the modified logic cell 500 and is electrically transmitted to the adder 540 and the subtractor 550. At the same time, the lower input $i_l$ 504 enters the modified logic cell 500 and is electrically transmitted to the adder 540 and the subtractor 550.

The adder 540 adds the upper input $i_u$ 502 and the lower input $i_l$ 504. The result passes through the upper switch 520 to the upper output $o_u$ 512. At the same time, the subcontractor 550 also subtracts the lower input $i_l$ 504 from the upper input $i_u$ 502. The result passes through the lower switch 530 to the lower output $o_l$ 514. The scaling factor of 2 shown in the above table comes about because the least significant bit of the results of the adder 540 and the subtractor 550 are dropped. Dropping these bits is done for the convenience of keeping the number of bits in each input and output identical, and is not essential to the present invention.

The mode control 510 may also select pass-through mode for the modified logic cell 500. When the pass-through mode is selected, the modified logic cell 500 does not perform the FHT. When the pass-through mode is selected, the upper switch 520 makes an electrical connection with an upper pass-through lead 524 and the lower switch 530 make an electrical connection with a lower pass-through lead 534 to allow the modified logic cell 500 to perform the pass-through instead of the FHT.

In pass-through mode, the upper input $i_u$ 502 enters the modified logic cell 500 and is electrically transmitted to the upper output $o_u$ 512 via the upper switch 520. At the same time, the lower input $i_l$ 504 enters the modified logic cell 500 and is electrically transmitted to the lower output $o_l$ 514 via the lower switch 530. This yields the mathematical relationship shown in the table above for the pass-through mode.

Turning again to FIG. 4, each of the logic cells (1,1)-(4,8) have generally the same structure as the modified logic cell 500. As noted in the discussion above, each of the vectors V0-VF may be segmented into two groups, a first group of vectors V0-V7 and a second group of V8-VF. The first halves of the vectors in first group (V0-V7) are identical in sequence to the first halves of the vectors in the second group (V8-VF). That is, the first half of vector V0 is identical to the first half of V8, the first half of V1 is identical to the first half of V9, the first halves of V2 and VA are identical, and so on in sequence. Each vector V0-VF has one and only one "partner" vector with which it is not "orthogonal-in-the-half." That is, for each half of each vector, only one other vector contains that half or its antipode. For example, vector V4 is not orthogonal-in-the-half with vector VC. The 8-chip sequence of any vector half may be used to convey information at a rate of two information bits per 16-chip epoch as long as the partner vector is not used.

Turning to the FHT structure 400, the outputs of each of the cells in the fourth column 408 are the partner vectors which are not orthogonal-in-the-half. For example, the outputs of cell (4,1) come from vector V0 and vector V8, which are not orthogonal-in-the-half. Thus, as noted, signals for a pair of non-orthogonal-in-the-half vectors automatically converge at a single logic cell in the FHT structure 400. A two-bit-per-epoch user will be orthogonal to all remaining one-bit-per-epoch users (since they are using spreading vectors that emerge at different rightmost cells). Since the half-vectors entering each cell on the right are orthogonal to the half-vectors entering all other cells, this approach also ensures that all two-bit-per-epoch users are mutually orthogonal.

By setting a single logic cell in the fourth column 408 to pass-through mode, a data rate of two bits per epoch may be established. For example, setting the logic cell (4,1) to pass-through mode allows two-bit-per-epoch communication via vector V0. In operation, the first of the two bits is observed at the output of the logic cell (4,1) that is labeled as V0, and the second of the two bits is observed at the output labeled VB.

Similarly, because each of the logic cells in the fourth column 408 is paired with its partner vector, two-bit-per-epoch communication may be supported at any of the eight logic cells in the fourth column by selecting the pass-through mode for that cell. The first of the two information bits may then be observed at the upper output of the cell and the second of the information bits may be observed at the lower output of the cell.

The pass-through concept may be extended further back into the FHT structure 400 to provide for four-bit-per-epoch users, eight-bit, and so on. However, the way in which the basic logic cells are set to the pass-through mode to obtain higher bits-per-epoch usage is not as straightforward as in the two-bit case. For example, for the case of four-bit-per-epoch usage, two cells in the fourth column 408 and also two cells in the third column 406 must be placed in pass-through mode. The set of cells placed in pass-through mode must couple together all four vectors that are not orthogonal-in-the-quarter to maintain orthogonality within the vector set.

As an example, to obtain a four-bit-per-epoch output on vector V0, cells (4,1) and (4,2) of column 4 and cells (3,1) and (3,5) of column 3 in FIG. 4 must all be placed in pass-through mode. When so configured, the outputs at the fourth column 408 are the four inputs to cells (3,1) and (3,5) which correspond, from top to bottom, to the four bits carried.

For example, in order to maintain a data rate of one information bit per epoch via vector V0, no cells in the FHT structure 400 of FIG. 4 must be set to pass-through mode. To maintain a data rate of 2 information bits per epoch via vector V0, one cell (4,1) in the FHT structure 400 must be set to pass-through mode. To maintain a data rate of 4 information bits per epoch via vector V0, four cells [(3,1), (3,5), (4,1), and (4,2)] in the FHT structure 400 of FIG. 4 must be set to pass-through mode. To maintain a data rate of 8 information bits per epoch via vector V0, twelve cells [(2,1), (2,3), (2,5), (2,7), (3,1), (3,2), (3,5), (3,6), (4,1), (4,2), (4,3), and (4,4)] in the FHT structure 400 of FIG. 4 must be set to pass-through mode. Finally, to maintain a data rate of 16 information bits per epoch via vector V0, all 32 cells [(1,1)-(4,8)] in the FHT structure 400 of FIG. 4 must be set to pass through mode.

Figure 6:
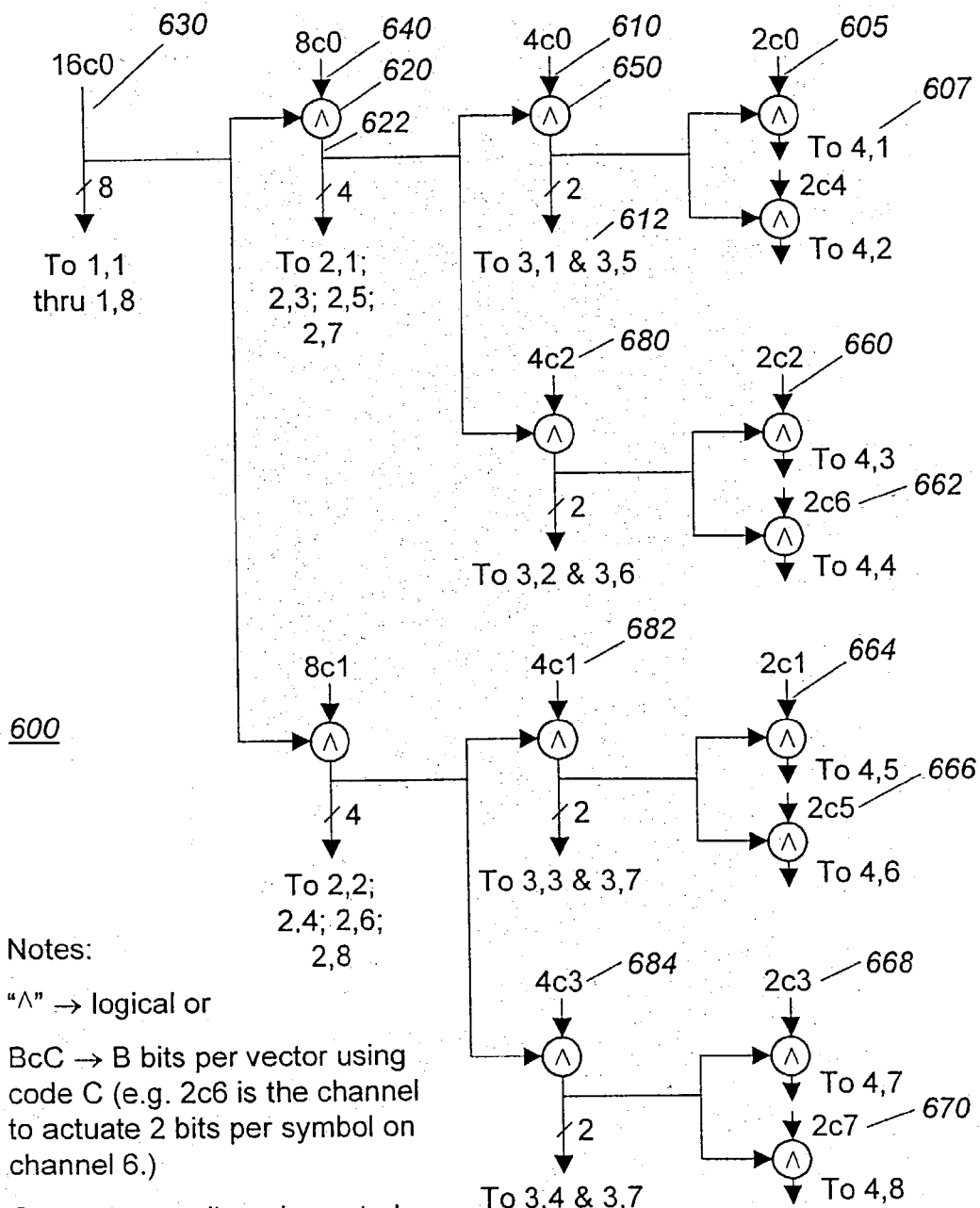
FIG. 6 shows a preferred embodiment of an exemplary control logic tree according to the present invention.

FIG. 6 shows an exemplary control logic tree 600 which may be used to set the logic cells of the FHT structure 400 to either combine mode or pass-through mode. To illustrate how the logic tree 600 works, take the above example of a data rate of two information bits per epoch via vector V0. The data rate and vector are expressed in the logic tree 600 as BcC, that is B bits per vector epoch using code (vector) C. For example, the condition of two information bits via vector V0 is expressed in the logic tree 600 as 2c0. Each of the cells in the FHT structure 400 is represented in the logic tree 600 as cell C,R where C indicates the column of the cell and R indicates the row.

To select a data rate of two information bits per epoch using vector V0, the control line 2c0 605 is activated. The 2c0 control line 605 then activates the cell (4,1) 607 to initiate pass-through mode in the cell (4,1) 607 as described above. In the exemplary control logic tree 600, a two-bit-per-epoch communication rate may be sustained using vectors V0 (2c0) 605, V4 (2c4) 615, V2 (2c2) 660, V6 (2c6) 662, V1 (2c1) 664, V5 (2c5) 666, V3 (2c3) 668, and V7 (2c7) 670 as shown.

Now considering a data rate of four information bits per epoch via vector V0, expressed as 4c0 610, the 4c0 control line 610 activates the cells (3,1) and (3,5) 612 as shown. Additionally, the 4c0 control line 610 is transmitted to an OR gate also entered by the 2c0 control line 605 which activates the cell (4,1) 607 and an OR gate also entered by the 2c4 control line 615 which activates the cell (4,2). In all, cells (3,1), (3,5), (4,1), and (4,2) are activated for the 4c0 data rate as described in the above example. In the exemplary control logic tree 600, a four-bit-per-epoch communication rate may be sustained using vectors V0 (4c0) 610, V2 (4c2) 680, V1 (4c1) 682, and V3 (4c3) 684 as shown.

Thus, cell (4,1) 607 is activated when the 2c0 control line 605 is activated and also when the 4c0 control line 610 is activated. This is equivalent to passing the 2c0 control line 605 and the 4c0 control line 610 through an OR gate and using the resulting output signal from the OR gate to activate the cell (4,1) 607.

The logical OR operation is symbolically represented in FIG. 6 as an inverted V inside a circle. The operation of each logical OR is generally similar. For example, the logical OR 620 takes as inputs the 16c0 control line 630 and the 8c0 control line 640, and generates an activation signal 622 if either control line is activated. The activation signal 622 then activates cells (2,1), (2,3), (2,5), and (2,7). The activation signal 622 is also supplied to another logical OR 650. The logical OR 650 generates an activation signal if either the activation signal 622 or the 4c0 control line 610 is activated. The operation of each logical OR shown in FIG. 6 proceeds similarly.

In the logic tree 600, the 16c0 control line 630 permits communication at a rate of 16 information bits per epoch via vector V0. The vector V0 may be referred to as a base vector for the logic tree 600 because the structure of the rest of the logic tree depends upon vector V0. Note that while FIG. 6 uses vector V0 as its base vector, any of the vectors V0-VF may be used as base vectors. Although the choice of a vector other than V0 as a base vector generally maintains the structure of the logic tree 600, the specific cells activated for each data rate must be changed to reflect the vector chosen as a base vector.

Although the logic tree 600 may be implemented as hardware with each of the logical OR functions performed by a physical logical OR gate, the logic tree 600 is preferably implemented as software. While the hardware implementation of the logic tree 600 may possibly yield faster switching, a software implementation is preferred because of the greater flexibility allowed.

The software implementation of the logic tree 600 allows greater flexibility in terms of assigning a base vector as well as in allowing vectors to be assigned for multiple-bit-per-epoch communication. For example, implementing the logic tree 600 as hardware allows four-bit-per-epoch communication only via vectors V0, V1, V2, and V4. Users at four bits per epoch would be required to switch to one of these vectors. Implementing the logic tree 600 as software may permit communication at four bits per epoch via any vector in the set. Once the four-bit-per-epoch vector is selected, the software system may be configured to eliminate the non-orthogonal vectors.

Alternatively, a software implementation of the exemplary logic tree 600 may provide real-time, dynamic assignment of communication vectors based on a number of factors including noise conditions and environmental effects. The increased flexibility of the software implementation may also allow vectors to be reassigned to multiplebit-per-epoch users in a way that minimizes the number of re-assigned or deactivated vectors.

Turning to FIG. 3, the exemplary logic tree 600 may be implemented as part of the selection logic 340. In operation, externally determined channel rate selections 342 are supplied to the selection logic 340. The channel rate selections 342 are a set of inputs that configure the selection logic 340. Turning again to the selection logic tree 600, it may be observed that there are a total of 1+2+4+8 or 15 control lines 630-670 forming the input to the logic tree. While 15 binary input lines are sufficient to control the configuration, a fewer number of bits may be used to control the selection logic 340 since the number of valid states that the logic may assume is less than 215. That is, while there are eight independent controls (605, 607, 660, 662, 664, 666, 668, 670) for two-bit-per-epoch selections, there are only four (610, 680, 682, 684) for four-bit-per-epoch selections, two 640, 644 for eight-bit-per-epoch selections and one 630 for 16-bit-per-epoch selections.

Since the four-bit-per-epoch settings 610, 680, 682, 684 override the two-bit-per-epoch settings via the OR gates which produce the control signals for the fourth column 408 of the FHT, the configuration controls are not independent. For the example selection logic tree 600, the total number of distinct configurations that may be effected is $2^1+2^2+2^4+2^8$ or 278. Thus, as few as 9 binary controls may be sufficient to control the selection logic 340.

The selection logic 340 receives the channel rate selections 342. The selection logic 340 provides a cell mode control signal 344 to each of the 32 cells of the modified FHT 330 based on the channel rate selections 342. The cell mode control signal 344 is received by the 32 logic cells of the modified FHT 330 and each logic cell is set to either combine mode or pass-through mode based on the received cell mode control signal 344.

As an example of the operation of the preferred embodiment of the multi-channel receiver 300, consider the example case previously illustrated in FIG. 2. That is, four-bit-per-epoch usage on vectors V0 and V1; two-bit-per-epoch usage on vectors V2, V3, and V6; and one-bit-per-epoch usage on vectors V7 and VF.

The channel rates for the above vectors (such as four bits per epoch on vector V0) are supplied to the selection logic 340 as the channel rate selections 342.

Turning to the exemplary logic tree 600, to accommodate the four-bit-per-epoch usage on V0 and V1, the control lines 4c0 610 and 4c1 682 are activated. The activation of the control line 4c0 610 switches the cell mode control 344 of the logic cells (3,1), (3,5), (4,1) and (4,2) to pass-through mode. The activation of the control line 4c1 682 switches the cell mode control 344 of the logic cells (3,3), (3,7), (4,5) and (4,6) to pass-through mode.

To accommodate the two-bit-per-epoch usage on V2, V3, and V6, the control lines 2c2 660, 2c3 668, and 2c6 662 are activated. The activation of the control line 2c2 660 switches the cell mode control 344 of the logic cell (4,3) to pass-through mode. The activation of the control line 2c3 668 switches the cell mode control 344 of the logic cell (4,7) to pass-through mode. The activation of the control line 2c6 662 switches the cell mode control 344 of the logic cell (4,4) to pass-through mode.

To accommodate the one-bit-per-epoch usage on vectors V7 and VF, no additional control lines need be activated in the exemplary logic tree 600. With no additional control lines activated, no additional cells are switched to pass-through mode, and one-bit-per-epoch usage on V7 and VF is achieved.

The operation of the modified FHT 330 as configured per the preceding paragraphs proceeds as follows: A received signal 302 is downconverted and filtered 310 to yield an analog baseband signal 315. The analog baseband signal 315 is supplied to an integrate and dump block 320 which yields sixteen soft decision chip level observables $\{r_j\}$ 325. The sixteen soft decision chip level observables 325 are transmitted in order to the sixteen inputs of the modified FHT 330 (labeled 0-F in FIG. 4).

Once the sixteen inputs are in place, the modified FHT operation begins. The sixteen inputs pass through the first column 402, second column 404, third column 406, and fourth column 408. At each cell, the inputs are either combined if the logic cell has been set to combine mode or are passed through if the logic cell has been set to pass-through mode.

The modified FHT operation runs to completion yielding sixteen soft decisions clocked at the vector rate $\{a_j\}$ 355. For the channel 4c0, the four bits per epoch may be found, in order, at $a_0$, $a_8$, $a_4$, and $a_C$ (the upper and lower outputs of cells (4,1) and (4,2)). For the channel 4c1, the four bits per epoch may be found, in order, at $a_1$, $a_9$, $a_5$, and $a_D$ (the upper and lower outputs of cells (4,5) and (4,6)). For the channel 2c2, the two bits per epoch may be found, in order, at $a_2$ and $a_A$, the upper and lower outputs of cell (4,3). For the channel 2c3, the two bits per epoch may be found, in order, at $a_3$ and $a_B$, the upper and lower outputs of cell (4,7). For the channel 2c6, the two bits per epoch may be found, in order, at $a_6$ and $a_E$, the upper and lower outputs of cell (4,4). For the channel 1c7, the one bit per epoch may be found at $a_7$ of cell (4,8). Finally, for the channel 1cF, the one bit per epoch may be found at $a_F$ of cell (4,8).

The sixteen soft decisions clocked at the vector rate $\{a_j\}$ 355 are provided to the sign detector 350 which determines the sign of the received soft decision. The sign detector 350 then transmits the recovered information 365 for further processing. The sixteen soft decisions clocked at the vector rate $\{a_j\}$ 355 may also be passed downstream 360 for further processing.

As an additional feature of the present invention, the modulation method and related processor may be simply adapted to provide coding gain. The operative principle is that, since the method is based on orthogonal signal vectors used in an antipodal manner, a signal constellation identical to that produced by a biorthogonal code may be created. This is because the structure of an optimum decision processor for a biorthogonal code is a superset of the FHT processor described above. Thus, the multi-channel receiver 300 of FIG. 3 may be adapted to process a biorthogonal code.

As an example of the adaptation of the present invention to biorthogonal coding, the present example (with v=4) may be modified to demonstrate the case of an (8, 4) biorthogonal code (which is well known in the literature of error control). This code occupies an eight-dimensional space with codewords being placed in antipodal pairs along each coordinate axis defining the space to yield sixteen codewords. Each codeword includes four information bits.

To introduce this code into the modulation scheme described above, a user may be assigned eight of the sixteen vectors in the space (any set of eight will suffice). At each vector epoch, the user may gather together four information bits which, collectively, define a vector "Vn" to use (one of eight in the eight-dimensional space) as well as the sign "s"(=±1) to select which of the antipodal signal points on that vector to use. The vector Vn may be expressed as three bits and the sign may be expressed as the fourth bit.

The user then sends the signal s * Vn. Note that only one of the eight vectors which are available to the user is utilized in each vector epoch. The optimum receiver for this signal set may require that the observable vector be correlated against the sixteen points in the signal constellation and the decision made in favor of the largest correlation. Since the signals occur in antipodal pairs, it is necessary only to form the eight correlations with the assigned vectors, choose the one with the largest magnitude to determine n, and then choose the sign s to agree with that of the associated largest correlation.

Mathematically this may be expressed as:

n=MAX[i∈{set assigned to user}:ABS[$a_i$]]

where $a_i$=SUM[j=0 to 15 :: $r_j$*$V_{ij}$]

and s=SGN[$a_n$]

The processing to form the set of correlations {$a_i$} is generally similar to the processing steps of the FHT, as described above. Therefore, the set {$a_i$} may be directly available at the outputs of the modified FHT 400 in FIG. 4. Note that the seven coordinates that are not used in each vector epoch in this example bear only noise. However, this is normal for such biorthogonal signaling. The processing step for the equations above that is not present in the modified FHT 400 of FIG. 4 is locating the maximum of the absolute values. Thus, an additional processing block to find MAX[ABS[$a_i$]] may be provided to perform this processing step.

Figure 7:
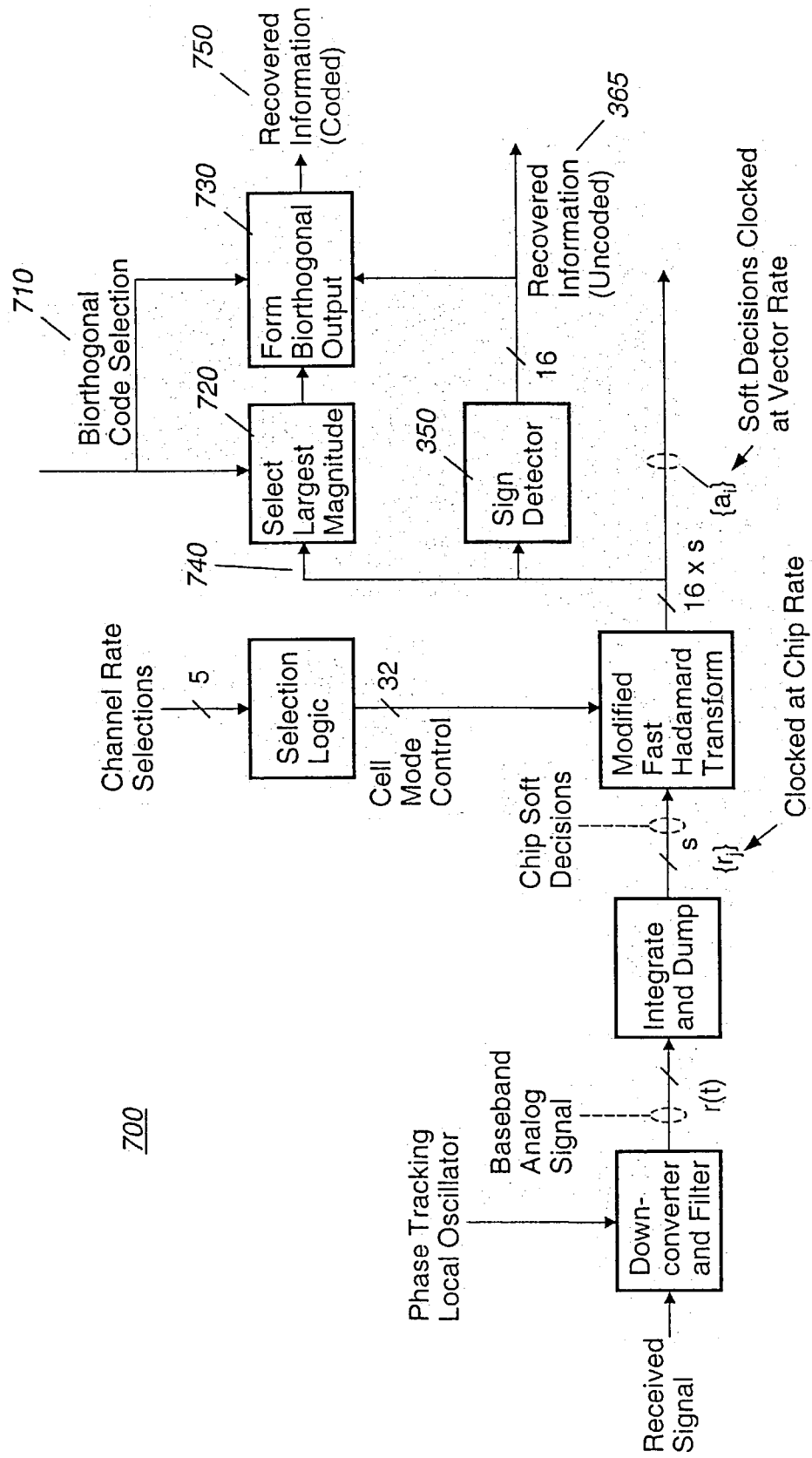
FIG. 7 illustrates a preferred embodiment of a modified multi-channel receiver for providing error control by means of biorthogonal coding according to the present invention.

Thus, the multi-channel receiver 300 of FIG. 3 may be modified to provide biorthogonal coding as shown in the biorthogonal receiver 700 of FIG. 7. In FIG. 7, a select block 720, a form block 730 and a biorthogonal code selection 710 are added to the multi-channel receiver 300 of FIG. 3. In the biorthogonal receiver 700, the biorthogonal code selection 710 is supplied to the select block 720 and the form block 730. The output of the modified FHT 740 is also supplied to the select block 720. The select block 720 receives the outputs of the modified FHT 740 and, from the subset of code vectors assigned to the coded application, selects the vector with the largest correlation magnitude. The selected vector is sent to the form block 730, which forms the output associated with the correlation.

The output of the modified FHT 740 is also supplied to the sign detector block 350 which determines the signs for all possible vectors. The sign detector 350 then sends the sign determinations to the form block 730. The form block 730 selects the sign associated with the selected vector as identified by the select block 720 and forms the corresponding biorthogonal output. The biorthogonal output is available as recovered information 750, comprising four bits in the example case.

The preceding example transferred four bits per vector epoch using eight of the code "channels" available. The example above is an instance of a rate-one-half biorthogonal code. A rate-one-half biorthogonal code may provide a net coding gain of approximately 2.0 decibels for signal-to-noise ratios typical for processing satellites. Thus, transmission using the biorthogonal code is more power-efficient than if four bits per epoch had been sent by the basic method described earlier. However, the biorthogonal code may be less bandwidth-efficient in that eight code channels must be assigned when using the (8,4) biorthogonal signal constellation rather than four when using four-bits-per-epoch transfer. Note that all eight of the code vectors used in this example must be configured for one-bit-per-epoch usage. During biorthogonal operation, all eight of the cells of FIG. 4 which carry vectors used for the biorthogonal code are set to "comb" mode rather than "pass" mode. Cells in FIG. 4 which do not carry vectors used for the biorthogonal code may be set to either "comb" or "pass" as needed to support single- or multi-bit-per-epoch operation, as described earlier.

The biorthogonal constellation may be generalized from the example above to include codes of the type ($2^w$, w+1) where w≦v. Also note that the case w=1 is the same as for the one-bit-per-epoch signaling described above, and the case w=2 is a variation on two-bit-per-epoch signaling.

Assignment of a vector to a user may be performed under central control by a network control center. The principles of vector assignment are similar to those used in managing frequency and time in FDMA and TDMA networks, respectively, except for the constraint that assignment of a vector to a user requesting a rate of more than one bit per epoch requires that the subset of non-orthogonal vectors for that usage must all be currently unassigned. As an example, suppose that V0 through VD are all currently assigned to other users but that VE and VF are currently unassigned. Although in principle there is enough bandwidth to support a request for two-bit-per-epoch usage on either of these two vectors, the fact that V6 and V7 (the two non-orthogonal-in-the-half vectors, respectively, for VE and VF) are in use precludes the use of either of vectors VE or VF for two-bit-per-epoch usage. Each vector may be assigned for one-bit-per-epoch usage, however, or the vectors in use may be reassigned so as to free up one or the other of V6 and V7, thus permitting the request to be honored.

Additionally, the structure of FIG. 4 and FIG. 6, which were noted above to have the same "bit-reversed" numbering scheme that is encountered with the FFT, may be used as a template for the efficient allocation of code vectors to users of various information rates. With this template, fragmentation may be minimized by keeping large bits-per-epoch blocks intact when assigning vectors for lower rate usage.

Recall that FIG. 4 and FIG. 6 are drawn specifically for the example where v=4, which was chosen to be small enough to be tractable for discussion and for illustration but large enough to illustrate the key concept of carrying different information rates by the modulation method of the invention. The value v=4 is merely representative, and the structure may be readily generalized for higher or lower values of v. As a more commercially realistic example of this modulation method for implementation in a processing satellite, suppose that it is desired to provide a nominal information rate of 8 kilobits per second, with the ability to increase the rate within the basic modulation method by a factor of 256, that is up to 2.048 Mb/s, which is the E1 rate. (That is, v=8 for this second example.) The basic spreading vector would be one of the Walsh functions of length 256 and the chip rate would be 8 k*256 or 2048 kilochips per second. Assuming BPSK modulation, the symbol rate is identical to the chip rate and the approximate (half power) bandwidth is 2 MHz. Multiples of these CDMA channels could be frequency multiplexed at typical intervals of 2.5 MHz or less, depending on the exact modulation format. The information rates that could be supported include: 8, 16, 32, 64, 128, 256, 512, 1024, and 2048 kilobits per second, and the maximum number of channels "Nj" that may be supported at each rate is, respectively, 256, 128, 64, 32, 16, 8, 4, 2, and 1. The corresponding information bits per vector are 1, 2, 4, 8, 16, 32, 64, 128, and 256. The mix of the number of active channels of the various classes $\{N_j\}$ must satisfy:

$$\mathrm{SUM}[j=0, v: N_j*2^j] \leq 256$$

For the general case of v, this last relationship generalizes to:

$$\mathrm{SUM}[j=0, v: N_j*2^j] \leq 2^v$$

Figure 8:
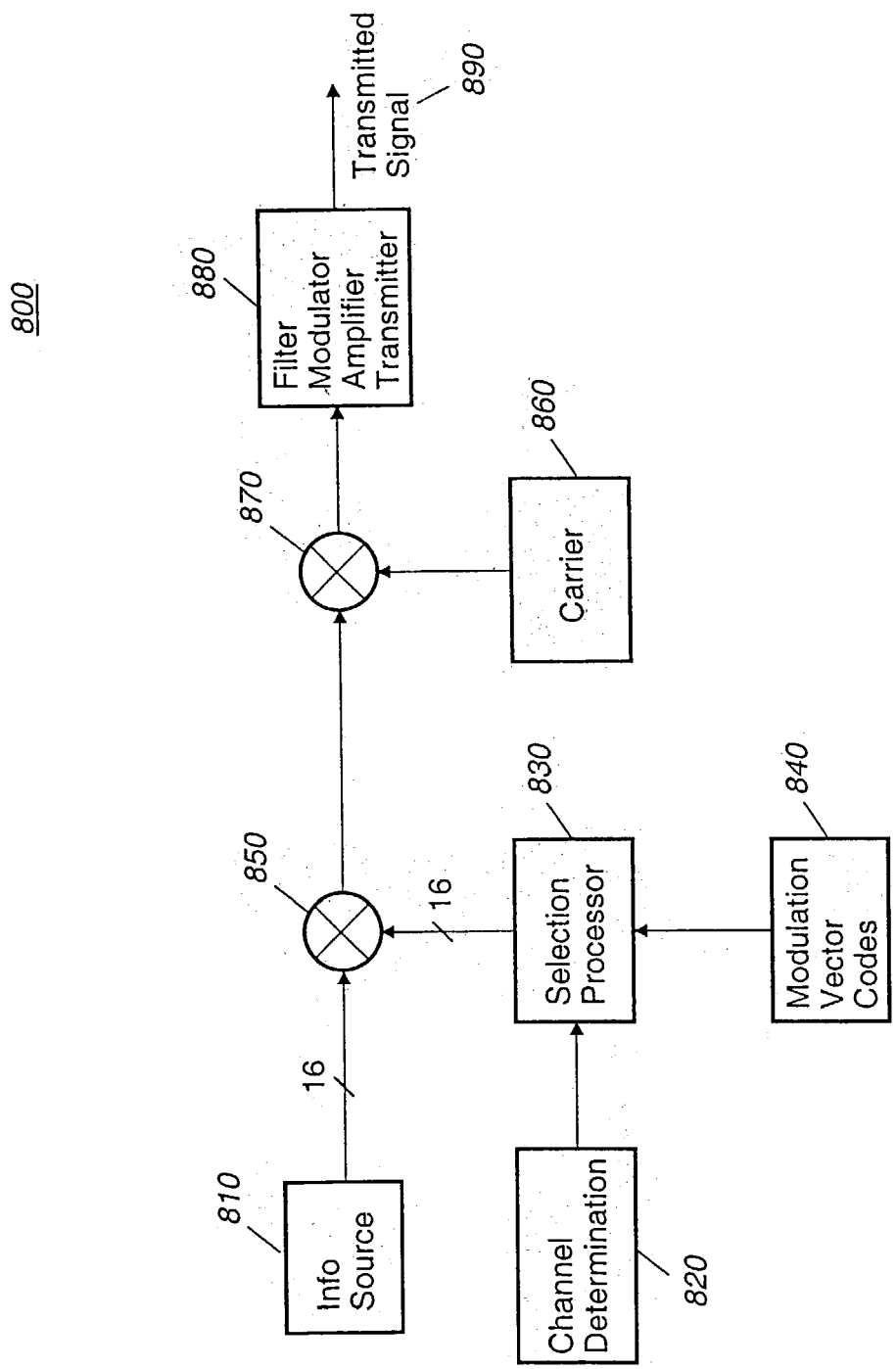
FIG. 8 depicts the structure for a preferred embodiment modulator and error control encoder.

FIG. 8 illustrates a preferred embodiment of the structure of a multi-channel transmitter 800 incorporating the present invention. The multi-channel transmitter includes an information source 810, a channel determination 820, a selection processor 830, a modulation vector code supplier 840, a first mixer 850, a carrier signal 860, a second mixer 870, and a filter/modulator/amplifier/transmitter 880. In operation, the channel determination 820 is supplied with either the channel rate selections (similar to the receiver 300 above) or the biorthogonal coding structure if biorthogonal transmission has been selected. The channel determination 820 transmits the rate and encoding selections to the selection processor 830. The selection processor 830 additionally receives the modulation vector codes 840.

The selection processor 830 uses the rate and encoding selections provided by the channel determination 820 to select the desired vector stream for each channel, up to sixteen in this example. The selection processor prevents the allocation of non-orthogonal vectors and may additionally perform real-time reallocation of channels to maintain an optimum communication channel set or provide for biorthogonal transmission. Once the selection processor 830 has determined the vector coding for each of the up-to-sixteen channels, the channels are modulated individually with up to sixteen information sources 810 in the mixer 850.

Once the info source 810 has been modulated with the vector selections from the selection processor 830, the result is mixed with a carrier signal 860 in the mixer 870 to bring the signal to the desired transmission band. The resultant signal is passed through further processing that may include filtering, frequency translation and amplification, at block 880. The resultant signal is transmitted 890 to a receiver such as the multi-channel receiver 300 of FIG. 3.

Figure 9:
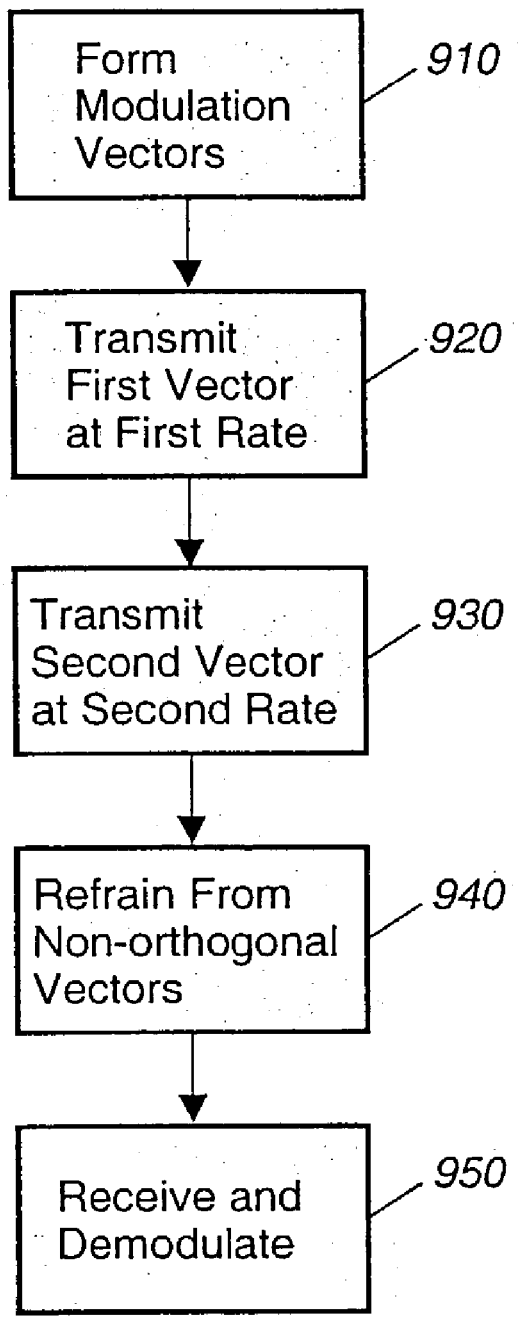
FIG. 9 illustrates a high level flow chart of an exemplary use of the invention.

FIG. 9 illustrates a high-level flow chart 900 of an exemplary use of the present invention. In FIG. 9, the present invention is used to transmit two-information sources at different rates. A set of orthogonal spreading modulation vectors, such as that shown in FIG. 1, is formed at step 910. The first information source is transmitted at a first information rate over a selected vector at step 920. The second information source is transmitted at a second information rate using a portion of a second vector at step 930. The portion of the second vector used for transmission is selected to be orthogonal to the first vector. The system refrains from using any other vector not orthogonal to the portion of the second vector to transmit information at step 940. The transmitted first and second information vectors are received and demodulated at step 950.

While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications and incorporate those feature which come within the spirit and scope of the invention.

What is claimed is:

1. A multirate communication system comprising:
    a set of orthogonal spreading modulation vectors, each vector being $2^v$ chips in length, where v is any positive integer, each modulation vector supporting the transfer of information at a first information rate;
    a first subset of the set of modulation vectors defining biorthogonal codewords for biorthogonal coding of information;
    a second subset of the set of modulation vectors supporting the transfer of information at an information rate $2^n$ times the first information rate, where n is any positive integer, with the exclusion of $(2^n-1)$ vectors in said set of modulation vectors not orthogonal to the first $2^{(v-n)}$ chips of said set of modulation vectors;
    a transmitter for modulating and transmitting information over said set of modulation vectors; and
    a receiver for receiving and demodulating information over said set of modulation vectors.

2. The communication system of claim 1 wherein the set of modulation vectors supports the simultaneous transfer of information at variable rates of $2^n$ times the first information rate, the total information transfer rate for the set remaining less than or equal to $2^v$ bits per vector epoch.

3. The communication system of claim 1 wherein said set of modulation vectors comprises a Hadamard matrix.

4. A multirate receiver comprising:
    an adaptable modified Fast Hadamard Transform (FHT) operating on the vectors of a Hadamard matrix, said FHT comprised of logic cells that may be set to either a pass or combine mode to allow multirate communication over the vectors of the Hadamard matrix;
    a selection logic selecting either pass or combine mode for logic cells of said adaptable FHT in response to channel rate selections;
    a sign detector detecting the sign of a received observable vector;
    a magnitude selector for selecting the largest correlation of a received observable vector to a biorthogonal code selection; and
    a biorthogonal output former receiving the largest correlation selected by said magnitude selector and the sign detected by said sign detector and decoding received information.

5. The receiver of claim 4 wherein each vector is $2^v$ chips long where v is any positive integer.

6. The receiver of claim 4 wherein the vectors are grouped into a first subset which supports the transfer of information at an information rate $2^n$ times the first information rate with the exclusion of $(2^n-1)$ vectors in said set not orthogonal to the first $2^{(v-n)}$ chips of said modulation vector and a second subset which supports biorthogonal coding.

7. The receiver of claim 6 wherein the set of modulation vectors supports the simultaneous transfer of information at variable rates of $2^n$ times the first information rate, the total information transfer rate for the set remaining less than or equal to v bits per vector epoch.

8. The receiver of claim 6 wherein the logic cells of the FHT are set to pass and combine modes to provide said variable information rate information transfer and said biorthogonal coding.

9. The receiver of claim 4 wherein the output of said FHT forms soft decisions which are passed to further processing units in the receiver.

10. The receiver of claim 9 wherein the output of said sign detector forms uncoded recovered information which is passed to further processing units in the receiver.

11. A method for transmitting information comprising:

forming a set of orthogonal spreading modulation vectors having a first first subset of vectors having said first length;

transmitting information at a second information rate using a portion of a second vector of said first subset of vectors, said portion of said second vector orthogonal to said first vector, wherein each modulation vector of said first subset supports the transfer of information at an information rate $2^n$ times the first information rate with the exclusion ($2^n-1$) vectors in said set not orthogonal to the first $2^{(v-n)}$ chips of said modulation vector;

transmitting information using biorthogonal coding of the vectors in said second subset;

refraining from transmitting using any vector in said first subset not orthogonal to said portion of said second vector;

refraining from transmitting using any vector in said first subset not orthogonal to the vectors of said second subset;

receiving and demodulating said information transmitted at said first and second information rates and with said biorthogonal coding.

12. The method of claim 11 wherein each modulation vector is $2^v$ chips long where v is any positive integer.

13. The method of claim 11 wherein the set of modulation vectors supports the simultaneous transfer of information at variable rates of $2^n$ times the first information rate, the total information transfer rate for the set remaining less than or equal to v bits per vector epoch.

14. The method of claim 11 wherein said set of modulation vectors comprises a Hadamard matrix.

\* \* \* \* \*